United States Patent
Lou

(10) Patent No.: US 9,716,519 B2
(45) Date of Patent: *Jul. 25, 2017

(54) DYNAMIC ACCESS MANAGEMENT OF WIRELESS COMMUNICATION RESOURCES

(71) Applicant: AT&T INTELLECTUAL PROPERTY I, LP, Atlanta, GA (US)

(72) Inventor: Yuang Lou, Dunwoody, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/141,400

(22) Filed: Apr. 28, 2016

(65) Prior Publication Data
US 2016/0241284 A1    Aug. 18, 2016

Related U.S. Application Data

(63) Continuation of application No. 14/086,543, filed on Nov. 21, 2013, now Pat. No. 9,350,523.

(51) Int. Cl.
*H04B 1/10* (2006.01)
*H04L 5/14* (2006.01)
(Continued)

(52) U.S. Cl.
CPC ............ *H04B 1/1027* (2013.01); *H04L 5/14* (2013.01); *H04W 4/02* (2013.01); *H04W 24/02* (2013.01); *H04L 5/0005* (2013.01)

(58) Field of Classification Search
CPC ....... H04W 72/00; H04W 24/02; H04W 4/02; H04L 5/14; H04L 5/0005; H04B 1/10
See application file for complete search history.

(56) References Cited

U.S. PATENT DOCUMENTS

| 5,218,630 A | 6/1993 | Patsiokas et al. |
| 5,940,763 A | 8/1999 | Alperovich et al. |

(Continued)

OTHER PUBLICATIONS

Anderlind, Erik, "Resource Allocation in Multi-Service Wireless Access Networks", Department of Signals, Sensors and Systems Royal Institute of Technology, Stockholm, Sweden, Oct. 1997, 158 pages.

(Continued)

*Primary Examiner* — Andrew Lai
*Assistant Examiner* — Sumitra Ganguly
(74) *Attorney, Agent, or Firm* — Guntin & Gust, PLC; Jay H. Anderson

(57) ABSTRACT

A system that incorporates the subject disclosure may include, for example, determining interference at a receiver of a wireless mobile device based on an updated indication of receiver performance at a receiver frequency. A wireless interference pattern is determined based on wireless emitters operating at a number of emitter frequencies. Distances are determined between the wireless mobile device and at least some of the wireless emitters, and an interference source is identified based on both of the wireless interference pattern and the distances. After determining the interference source, one of the emitter frequency, the receive frequency, or a combination thereof, is reassigned to a new frequency. The frequency reassignment is based on the interference pattern and separation distances and results in a modification to the interference pattern. Other embodiments are disclosed.

20 Claims, 6 Drawing Sheets

(51) Int. Cl.
  *H04W 24/02* (2009.01)
  *H04W 4/02* (2009.01)
  *H04L 5/00* (2006.01)

(56) References Cited

U.S. PATENT DOCUMENTS

| | | | |
|---|---|---|---|
| 6,023,621 | A | 2/2000 | Jackson et al. |
| 6,240,275 | B1 | 5/2001 | H'Mimy et al. |
| 7,023,815 | B2 | 4/2006 | Zeira et al. |
| 7,257,376 | B2 | 8/2007 | Reudink |
| 7,436,788 | B2 | 10/2008 | Huschke et al. |
| 2007/0004420 | A1* | 1/2007 | Reudink ............... H04W 16/10 455/450 |
| 2007/0189205 | A1 | 8/2007 | Terry et al. |
| 2008/0108360 | A1 | 5/2008 | Baarman et al. |
| 2009/0296640 | A1 | 12/2009 | Gilbert |
| 2010/0255794 | A1* | 10/2010 | Agnew ................. H04W 16/14 455/77 |
| 2010/0322171 | A1 | 12/2010 | Dekorsy et al. |
| 2011/0009145 | A1 | 1/2011 | Pirinen |
| 2012/0040687 | A1* | 2/2012 | Siomina ................ G01S 5/0205 455/456.1 |
| 2013/0165134 | A1 | 6/2013 | Touag et al. |
| 2013/0170371 | A1 | 7/2013 | Reudink |
| 2014/0301217 | A1* | 10/2014 | Choi .................... H04W 28/08 370/252 |

OTHER PUBLICATIONS

Haas, Harald et al., "A Dynamic Channel Assignment Algorithm for a Hybrid TDMA/CDMA-TDD Interface Using the Novel TS-Opposing Technique", IEEE Journal on Selected Areas in Communications, vol. 19, No. 10, Oct. 2001, 1831-1846.

* cited by examiner

100A

100B

200

300

DYNAMIC ACCESS MANAGEMENT OF WIRELESS COMMUNICATION RESOURCES

CROSS REFERENCE TO RELATED APPLICATIONS

This application is a continuation of U.S. application Ser. No. 14/086,543, filed Nov. 21, 2013, which is incorporated herein by reference in its entirety.

FIELD OF THE DISCLOSURE

The subject disclosure relates to dynamic access management of wireless communication resources.

BACKGROUND

Over the past 25 years or so, a host of wireless mobile communication services have been successfully developed and deployed. Mobile communications initially provided mobile phone applications to support voice calls, e.g., along highways where landlines were not readily available. Wireless service then expanded territorial coverage into urban environments and residential neighborhood. Rapid development of wireless infrastructure and continued roll out of advanced wireless mobile technologies continues to expand access to such services. Service feature coverage has been extended from voice communications to include data applications such as text messaging, e.g., SMS, and email. Advances in wireless mobile data services eventually merged with Internet access allowing mobile devices to support online data search and to deliver streaming media, such as video clips, including video on demand and multicast of television (TV) programs.

Mobile devices are becoming more akin to mini computers, providing users with wireless access virtually anytime and anywhere, and serving as concentrated service delivery points for multi-mode and multi-band network access.

The success of mobile internet access makes an urgent call that more radio frequency (RF) spectrum is required as the basic resource to support its fast growth and higher service performance.

In general, there are two popular access technologies in the field of mobile Internet. One is referred to as Frequency Division Duplex (FDD) and the other is referred to as Time Division Duplex (TDD). FDD access technologies assign one spectral segment, or block of RF spectrum, for the downlink communications, e.g., from a base station to a mobile device, and another block of RF spectrum for corresponding uplink communications, e.g., from the mobile device to the base station. A so called guard band is generally provided, e.g., by regulation, between the uplink and downlink blocks of RF spectrum, providing some spectral separation between the two bands to avoid any possibility of interference. Once an FDD session, e.g., an uplink and downlink channel is assigned, no matter the uplink or downlink transmitter is transmitting or not, its spectrum is already allocated and no other session can use it.

TDD access technologies are distinguishable from FDD access technologies. Instead of pairing allocated spectrum as in FDD, there is only one RF block assigned to communication sessions, including both uplink and downlink transmissions. Spectrum sharing is accomplished in the time domain, such that at any time, there is only one-way transmission within the given RF block, an uplink or a downlink, but not both uplink and downlink. This is true no matter how many wireless devices are being served within the same RF block and by the same base station.

BRIEF DESCRIPTION OF THE DRAWINGS

Reference will now be made to the accompanying drawings, which are not necessarily drawn to scale, and wherein.

DETAILED DESCRIPTION

Figure 1A:
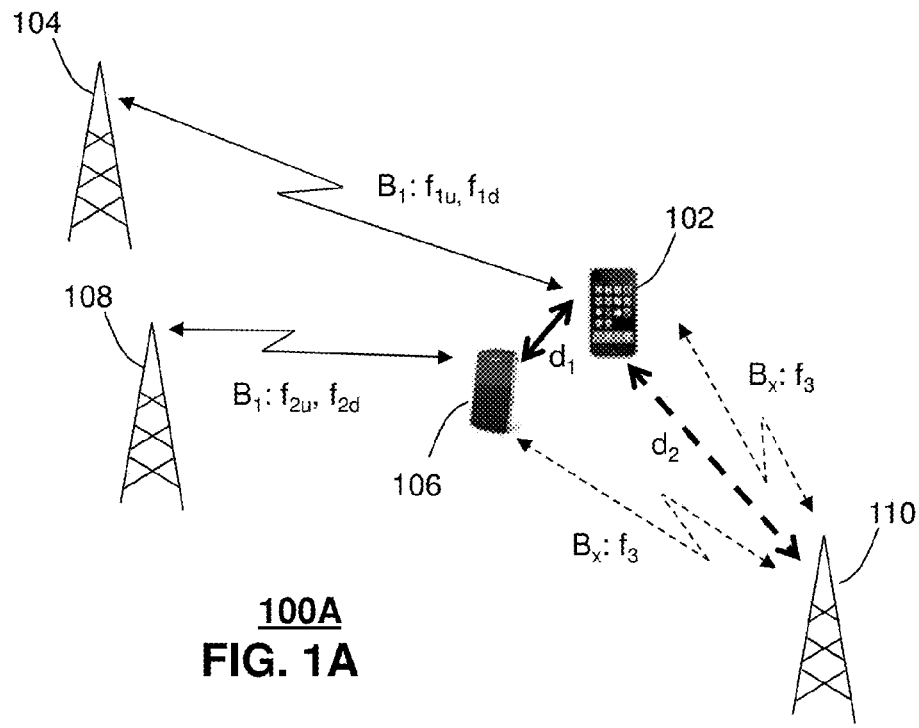
FIG. 1A depicts a schematic diagram of an illustrative interference scenario in which two mobile devices are operated in the same frequency band.

The subject disclosure describes, among other things, illustrative embodiments of determining an interference pattern between wireless emitters and a receiver of a wireless mobile device, and determining distances between the wireless emitters and the wireless mobile device. Interference at the receiver is determined according to an updated status report, such as, e.g., a status report received from the wireless mobile device. Upon detection of interference, an interfering source is identified, such as, e.g., by a mobile network in communication with the wireless mobile device, according to the interference pattern and the distances. In response to identifying the interfering source, one or more frequencies are reassigned to modify the interference pattern and thereby eliminate the source of interference. Other embodiments are included in the subject disclosure.

One embodiment of the subject disclosure includes a process that uses an interference controller to collect an updated indication of receiver performance at a mobile device. The interference controller includes a processor and the mobile device is operating at a receive frequency. The interference controller determines interference at the mobile device based on the updated indication of receiver performance at the receive frequency. A number of radio frequency emitters are identified by the interference controller at a plurality of emitter frequencies. A radio frequency interference pattern is determined by the interference controller based on the number of emitter frequencies. A number of separation distances between the mobile device and at least some of the number of radio frequency emitters are determined by the interference controller. An interference source is identified by the interference controller based on the determining of the radio frequency interference pattern and the determining of the number of separation distances, and one of an emitter frequency of the number of emitter frequencies, the receive frequency, or a combination thereof, is reassigned by the interference controller based on the interference pattern and a separation distances of the number of separation distances.

Another embodiment of the subject disclosure includes a device, having a memory to store executable instructions and a processor coupled to the memory. The processor, responsive to executing the instructions, performs operations including collecting an updated indication of receiver performance at a wireless device, wherein the wireless device is operating at a receive frequency. Interference is determined at the wireless device based on the updated indication of receiver performance at the receive frequency. A number of wireless emitters are identified at a plurality of emitter frequencies and a wireless interference pattern is determined based on the number of emitter frequencies. A number of separation distances are determined between the wireless device and at least some of the number of wireless emitters. An interference source is identified based on the determining of the wireless interference pattern and the determining of the number of separation distances, and one of an emitter frequency of the number of emitter frequencies, the receive frequency, or a combination thereof, is reassigned. The reassignment is based on the interference pattern and a separation distance of the number of separation distances.

Yet another embodiment of the subject disclosure includes a machine-readable storage device, including executable instructions. The executable instructions, responsive to being executed by a processor, cause the processor to perform operations including determining interference at a wireless device operating at a receive frequency based on an updated indication of receiver performance at the receive frequency. A wireless interference pattern is determined based on a number of emitter frequencies of wireless emitters operating at the number of emitter frequencies and a number of distances are determined between the wireless device and at least some of the plurality of wireless emitters. An interference source is identified based on the determining of the wireless interference pattern and the determining of the number of distances, and one of an emitter frequency of the number of emitter frequencies, the receive frequency, or a combination thereof, is reassigned. The reassignment is based on the interference pattern and separation distances of the number of distances.

In general, whenever an interference scenario occurs, the following three factors will generally be present altogether at a physical location. A first factor relates to an interference pattern formed at least in part by a frequency of a transmitted signal of a wireless emitter relative to the frequency of receiving signal. Namely, the transmitted signal generates or otherwise results in interference within the receiving band, which impacts the receiver performance A second factor relates to a physical separation or geographic distance between the interference transmitter resource and the victim receiver. If the distance is relatively short, the interference signal can be strong enough to cause interference. Signal strength generally drops off as $1/r^2$, so that increased physical separation tends to reduce the occurrence of such interference. In a mobile-to-mobile interference scenario, this distance is changing rapidly due to the random and relative positions of the mobile devices so that the interference could be dynamic and timely varying. A third factor relates the first two factors, such that they both occur (i) simultaneously and (ii) at a nearby physical location, and/or having a high power level. Consequently, a strategy to break, eliminate or otherwise modify anyone out of the above three factors, can prevent or stop the interference.

An RF resource manager, e.g., a network scheduler, can be configured to coordinate among the above three factors and break up or otherwise modify and/or elimination any interference pattern causing the potential interference. An ability to alleviate interference, can be combined with a dynamic access scheme, in which operational frequencies can be assigned significantly closer than previously allowed. To the extent interference is experienced for a given frequency assignment, contributing source(s) of the interference are quickly identified and new assignments are made to avoid or otherwise break up the interference pattern. With this proposed dynamic access scheme, spectrum utilization can be increased substantially, e.g., up to 90% or greater, to support continued business growth in mobile Internet under the constraint of limited and given RF spectrum assignments.

Referring to FIG. 1A, a schematic diagram is depicted of an illustrative interference scenario 100A. A first mobile communication device 102 is engaging in wireless communication with a remote entity, such as a nearby cell tower 104. It is understood that the cell towers disclosed herein generally include one or more antennas coupled to transceiver equipment, e.g., a base station or base transceiver station, to support uplink and downlink communications with one or more wireless mobile communication devices.

The first mobile device 102 is operating in a first radio frequency band $B_1$. For example, the first radio frequency band $B_1$ can be Band 7 of the E-UTRA operating band assignments. Band 7 is currently reserved for FDD mode operation and includes an uplink band segment, e.g., from 2500-2570 MHz, and a downlink band segment, e.g., from 2620-2690 MHz. At any given moment the first mobile communication device 102 can transmit a radio frequency uplink signal at a first uplink frequency $f_{1u}$ within the uplink band segment, and simultaneously receive a radio frequency downlink signal at a first downlink frequency $f_{1d}$ within the corresponding downlink band segment. As the mode of operation is FDD, the first mobile communication device can be transmitting and receiving at the same time as a result of a guard band, i.e., Band 38 of the E-UTRA operating bands.

The illustrative example also depicts a second mobile communication device 106 engaging in wireless communication with a different remote entity, such as a different cell tower 108. In the illustrative example, the second mobile device 106 is also operating in the first radio frequency band $B_1$, i.e., Band 7. At any given moment the second mobile communication device 106 can be transmitting a radio frequency uplink signal at a second uplink frequency $f_{2u}$ within the uplink band segment (a subscript "u" has been added to associate the frequency with an uplink), and receiving a radio frequency downlink signal at a second downlink frequency $f_{2d}$ within the downlink band segment (likewise, a subscript "d" has been added to associate the frequency with a downlink). For the sake of the illustrative example, it can be assumed that the first and second mobile devices 102, 106 are not transmitting or receiving on the same frequencies, i.e., $f_{1u} \neq f_{2u}$, and $f_{1d} \neq f_{2d}$.

Even though the mobile devices 102, 106 are not operating on the same frequencies within the operating band, it is still possible for one of the mobile devices, e.g., the second mobile device 106, to interfere with operation of the other, e.g., the first mobile device 102. By way of illustrative example, a portion of a second uplink signal at the second uplink frequency $f_{2u}$ of the second mobile device 106 can be received by the first mobile device 102. Depending upon such factors as the radio frequency signal strength of the second uplink signal $f_{2u}$ at the first mobile device 102, the portion of the second uplink signal $f_{2u}$ that is received can combine with the first uplink signal at the first uplink frequency $f_{1u}$. The combination results from a mixing of the signals due to system nonlinearities, e.g., within active components (power amplifiers) of one or more of the first or second mobile devices 102, 10.

Such nonlinear combinations of signals are generally well known and can be referred to as intermodulation, or intermodulation distortion. For a two-signal scenario, e.g., $f_a$, $f_b$, the frequencies of resulting intermodulation distortion can be predicted according to the following relationship:

$$f_{imd}(m,n)=|mf_a\pm nf_b|$$

$$m=0,1,2,\ldots;n=0,1,2,\ldots \quad \text{(Eqn. 1)}$$

So called odd order intermodulation distortion (IMD) products can be particularly troublesome, e.g., when:

$$|m\pm n|=3 \quad \text{(Eqn. 2)}$$

Under certain scenarios, $f_a$ and $f_b$ are an odd order IMD will result in intermodulation distortion that falls within the same band. This can occur, e.g., if the frequencies $f_a$ and $f_b$ are relatively close, e.g., within the same band, but that is not necessary. A prominent source of such odd order IMD is referred to as third-order intermodulation distortion (IMD3) according to Eqn. 2.

The degree to which the first and second mobile devices 102, 106 interfere with each other depends at least in part on a separation distance $d_1$ between the two devices 102, 106. Other contributing factors include signal strength, e.g., the amplitude or magnitude, of the uplink signals, antenna gain(s), filter selectivity, coupling loss, and so forth. For example, the signal level received by the first mobile device 102 at frequency $f_{2u}$, depends at least in part on the separation distance $d_1$. Thus, if the two mobile devices 102, 106 are relatively close, e.g., within the same room, or building, the signal level at frequency $f_{2u}$ may be sufficient to produce IMD3 at a receiver of the first mobile device 102. If, however, the two mobile devices 102, 106 are relatively distant, e.g., within the same cell, but many blocks or perhaps miles apart, the signal level at frequency $f_{2u}$ may be insufficient to produce any detectable IMD3 at the receiver at the first media device 102. So even though the possibility of IMD3 exists, e.g., according to Eqn. 2, there is no actual interference, because the physical separation is sufficient to inhibit generation of IMD3 at interfering levels.

In some instances, the illustrative scenario includes one or more other radio frequency emitters. For example, a fixed emitter 110 transmitting a radio frequency signal at frequency $f_3$ is located at a distance $d_2$ from the first mobile device 102. Depending upon the frequency $f_3$, the corresponding transmit signal strength and the separation distance $d_2$, it is possible for the fixed emitter 110 to impact performance of the first mobile device 102. Even for situations in which the frequency $f_3$ is located within a different frequency band, e.g., $B_x$, than the first mobile device 102, e.g., band $B_1$. In at least some instances, the frequency band $B_x$ of the fixed emitter 110 can be an adjacent band to the operating band $B_1$ of the first mobile device. An example fixed emitter 110 includes a radio frequency signal within the 2.4 GHz ISM band from 2400-2483.5 MHz. If the broadcast frequency $f_3$ is at either end of the ISM band, there is a possibility that it could interfere with operation of the first mobile device 102 within either Band 40 (i.e., 2300-2400 MHz) or Band 41 (i.e., 2495-2690 MHz) of the E-UTRA operating bands. Although the broadcast frequency $f_3$ would be outside of either of Band 40 or 41, it is possible, particularly for a strong signal that sufficient energy would couple into the receiver of the first mobile device 102 to impact performance. At least some mechanisms responsible for such adverse impact would be unintended activation of an automatic gain control (AGC) circuit within the receiver of the first mobile device 102, and/or desensitizing the receiver of the mobile device 102 by way of an analog-to-digital conversion (ADC) of the receiver accommodating an unwanted coupled portion of the broadcast frequency $f_3$. This desensitizing effect is sometimes referred to as "muting" of the receiver.

Alternatively or in addition, if the broadcast signal at frequency f3 is strong enough at the receiver of the first mobile device 102, it can result in generation of IMD.

$$f_{imd}(m,n)=|mf_1\pm nf_3|$$

$$m=0,1,2,\ldots;n=0,1,2,\ldots \quad \text{(Eqn. 3)}$$

Once again, for situations in which $|m\pm n|=3$, it is possible for an unwanted IMD3 frequency $f_{imd}$ to fall within the receiver bandwidth of the first mobile device 102.

Figure 1B:
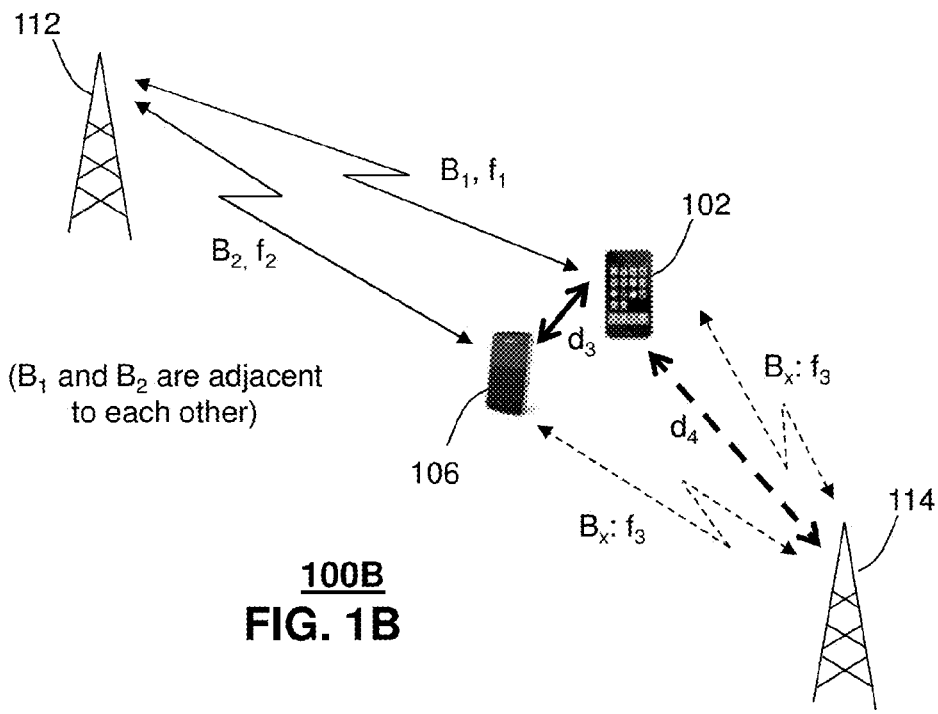
FIG. 1B depicts a schematic diagram of another illustrative interference scenario in which two mobile devices are operated in adjacent frequency bands.

FIG. 1B depicts a schematic diagram of another illustrative interference scenario 100B. In this scenario 100B, the first mobile communication device 102 is engaging in wireless communication with a remote entity, such as a nearby cell tower 112. The first mobile device 102 is operating in a first radio frequency band $B_1$; whereas, the second mobile device 106 is operating frequency band $B_2$. For example, the first radio frequency band $B_1$ can be Band 42 of the E-UTRA operating bands. Band 42 occupies 3400-3600 MHz, and is reserved for TDD operations. The second radio frequency band $B_2$ can be adjacent Band 43 of the E-UTRA operating bands. Band 43 occupies 3600-3800 MHz, and is also reserved for TDD operations.

Once again, an example of another radio frequency emitter is illustrated as a fixed emitter source 114. The fixed emitter source 114 is separated from the first mobile device 102 by a distance $d_4$, and broadcasting at a frequency or band of frequencies $f_3$, within a radio frequency band $B_x$.

The first mobile communication device 102 can be communicating uplink and downlink messages according to TDD operations, e.g., at a first frequency $f_1$ within the first band $B_1$. Likewise, the second mobile communication device 106 can be communicating uplink and downlink messages according to TDD operations, e.g., at second first frequency $f_2$ within the second band $B_2$.

TDD operation can performs uplink and downlink communications on a common frequency. As multiple channels or frequencies can be assigned to multiple mobile devices within a common radio frequency spectral segment, or band, the asymmetric ratio must be fixed to ensure that none of the mobile devices operating within the same band are transmitting, while others are receiving. This can be accomplished by establishing certain time slots, or time periods for transmission, and others for reception, i.e., quiet. Although current practices allow the asymmetric ratio to be adjustable, e.g., to a particular value (e.g., 3:1) or percentage, the ratio is not easy to adjust during operation, or otherwise modify "on the fly." Instead, the ratio can be modified according to particular times of the day, days of the week and so forth, but not in an ad hoc fashion.

Neighboring TDD bands, such as the aforementioned TDD bands, generally switch their uplink and downlink transmissions dynamically and independently. Sometimes, the TDD patterns in the neighboring bands are totally opposite to each other. In other words, while one band's TDD is receiving in a downlink, the neighboring TDD band is transmitting in the uplink. If these two mobile devices are within a relatively short distance, the high uplink Tx power from the neighboring band transmission can possibly "mute" the TDD receiver in both neighboring bands and also in short distance. Without a smart network resource alignment and management, it is challenging to control the TDD interference from one mobile device 106 to the neighboring mobile device 102.

With current TDD operations, a bandwidth is allocated to either uplink or downlink according to a predefined ratio, without regard as to whether there are data to transmit or not. Unfortunately, whenever the allocated RF resource is available but not used, other data session cannot simply share it. Consequently, TDD operations provide a limited improvement in spectrum utilization compared to that of fDD. Generally, current TDD operations can reach spectrum utilizations of perhaps 60% to 70%, but are not able to support greater utilization of 80% to 90% or more. A contributing factor for the aforementioned limitations to spectrum utilization relates to coordination of the uplink and downlink time periods. Namely, during mobile communications, both transmitters and receivers need to be re-trained periodically. During the re-training period, a few known preamble data are transmitted to assist the setup in channel encoding and decoding process. This effort is counted as part of the transmission overhead. For a TDD system, a message preamble can serve both uplink and downlink because they are on the same frequency block. For the FDD system, this preamble effort needs to be doubled where two-way transmission is configured on different RF blocks.

Other contributing factors for the spectrum utilization for TDD include wireless transmission delays. In general, a 3.3 microsecond/kilometer transmission delay poses a serious challenge to the TDD connection particularly when the TDD cell range is long. If the cell coverage radius is 3 miles or longer, it is critical to synchronize the TDD uplink to its downlink transmission. Since the delay is different for mobile connections and the delay time is varying on each mobile link, to synchronize a long distance TDD connection is really a challenging task which can also bring down the spectrum utilization in a TDD system. The synchronization challenge to the TDD delay is much relaxed in the small-cell and MIMO deployment. Due to the higher modulation, these TDD links are much shorter ranged. The standard deviation of their delay characteristics is narrowed down.

The illustrative example also depicts a second mobile communication device 106 engaging in wireless communication with a different remote entity, such as a different nearby cell tower 108. In the illustrative example, the second mobile device 106 is also operating in the first radio frequency band $B_1$, i.e., Band 7. At any given moment the second mobile communication device 106 can be transmitting a radio frequency uplink signal at a second uplink frequency $f_{2u}$ within the uplink band segment, and receiving a radio frequency downlink signal at a second downlink frequency $f_{2d}$ within the downlink band segment. For the sake of the example, it can be assumed that the first and second mobile devices 102, 106 are not transmitting or receiving on the same frequencies, $f_{1u} \neq f_{2u}$, and $f_{1d} \neq f_{2d}$.

Although the illustrative example referred to FDD operations with an FDD band, it is conceivable that similar interference can be experienced for TDD operations within a TDD band. Consider TDD operations in which $B_1$ corresponds to Band 38 of the E-UTRA operating bands. Even for scenarios in which the TDD aspect ratio of uplink-to-downlink transmissions is fixed for the first and second mobile devices 102, 106, it is possible for one to interfere with the other.

Figure 2:
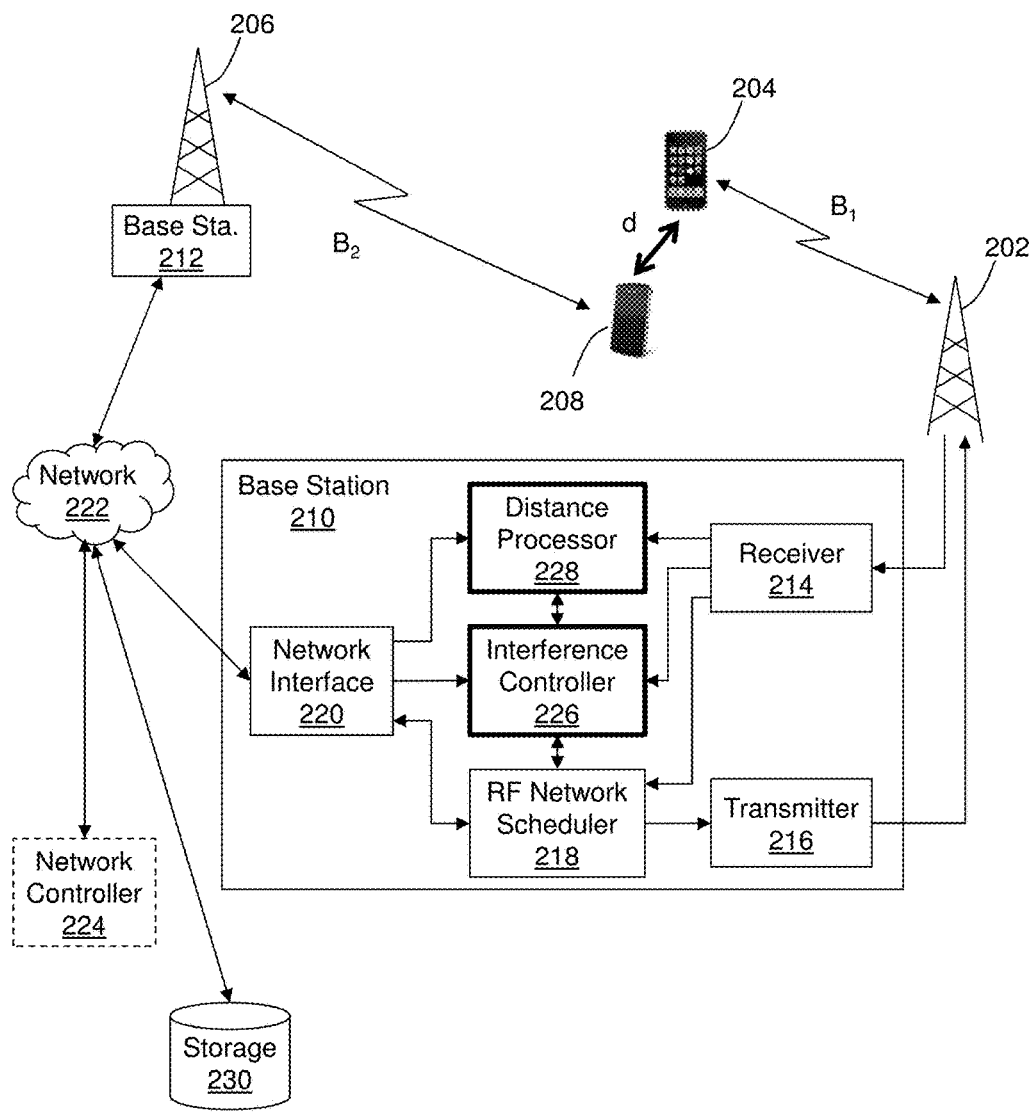
FIG. 2 depicts an illustrative embodiment of a system that can be utilized in mitigating the interference scenarios of FIG. 1A and FIG. 1B.

FIG. 2 depicts an illustrative embodiment of a system 200 that can be utilized in mitigating the interference disclosed in scenarios 100A, 100B of FIG. 1A and FIG. 1B. In the illustrative system, a first cell tower 202 is configured to communication with a first mobile device 204 using radio frequency signals within a first spectral band $B_1$. A second cell tower 206 is configured to communicate with a second mobile device 208 using radio frequency signals within a second spectral band $B_2$. The first and second mobile devices 204, 208 are separated by a distance d. Each cell tower can include a respective base station, sometimes referred to as a base transceiver station.

An example of a base station 210 associated with the first cell tower 202 is illustrated in more detail. It is understood that other base stations 212 can be similar to the base station 210 disclosed herein, or similar to more traditional base stations, e.g., without an intelligent network scheduler adapted to implement interference avoidance during periods of high-density spectral utilization.

The base station 210 includes a receiver 214 coupled to an antenna of the cell tower 202 to receive, e.g., an uplink signal(s) from one or more mobile devices, e.g., mobile device 204. The base station 210 also includes a transmitter 216 coupled to an antenna of the cell tower 202 to transmit, e.g., downlink signals from the cell tower 202, or from the base station 210, to the one or more mobile devices, e.g., mobile device 204. The base station 210 further includes a radio frequency (RF) network scheduler 218 in communication with each of the receiver 214 and the transmitter 216. The RF network scheduler 218 is in combination with the receiver 214 and the transmitter 216 can be configured to implement one or more wireless mobile communication protocols. By way of example, such protocols can include wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on.

In at least some embodiments, the base station 210 includes a network interface 220 for communicating with other devices and/or systems by way of one or more intervening networks, such as the example packet-switched IP network 222. By way of illustrative example, the base station 210 can optionally communicate with a network controller 224 (shown in phantom), and/or one or more other base stations, e.g., base station 212. Communications with the other base station(s) 212 can be directly through the network 222 and/or by way of another device or system such as the network controller 224.

By communicating with one or more other base station(s) 212 and/or a network controller 224, the base station 210 can coordinate wireless access to the one or more mobile device(s) 204 being managed by the base station 210. Such management can include transferring access between the base station 210 and the other base station 212, e.g., when the mobile device 204 moves from a wireless coverage area, e.g., cell, managed by the base station 210 to an adjacent cell managed by the other base station 212. Network coordination with the other base stations 212 and/or the network controller 224 can support roaming operation, e.g., when the mobile device 204 of a subscriber to a first service provider is managed by the base station 210 of another service provider. A communication exchange between the service providers can be used to support, subscriber identification, proper billing, and the like.

The illustrative base station 210 also includes an interference controller 226 and a distance processor 228. The interference controller 226 is in communication with the receiver 214, the RF network scheduler 214, the distance processor 228 and the network interface 220. Likewise, the distance processor 228 is in communication with the receiver 214, the interference controller 226 and the network interface 220. In at least some embodiments, one or more storage devices 230 are provided either locally (not shown), remotely, e.g., by way of the network 222, or some combination of locally and remotely.

The electronic storage 230 can be used to store information related to normal operation of the mobile cellular systems, such as subscribers, user equipment identities (EIDs), system capabilities, subscribed service(s) assigned frequencies, billing, and so forth. Alternatively or in addition, the storage 230 can be used to store information related to the intelligent network scheduling with interference avoidance to support high-density spectral utilization. Information related to operation of the intelligent network scheduling includes identification of wireless device(s) 204 receiving downlink services from the base station 210, downlink band and/or frequency assignment(s) of the wireless device(s) 204. The information further includes emitter frequencies of potential interferers to the wireless device(s) 204. This can include other uplink bands and/or frequencies of other mobile device(s) 208 managed by the base station 210 and/or other base station(s) 212, as well as frequencies of any other emitters, such as fixed emitters 110, 114 (FIGS. 1A-1B).

In addition to frequency, and possibly identities of the wireless devices 204, 208 and/or fixed emitters 110, 114, the information can include location information. The location information can be specific, e.g., geo-coordinates—latitude and longitude, an address, or some other reference, e.g., to a fixed location, such as a bearing and a range from the cell tower 202. The location information can include locations obtained during a site survey, e.g., for fixed emitters 110, 114 that might be updated periodically and/or operate according to a schedule, such as a broadcast schedule. Alternatively or in addition, the location information can include self-reported information, such as GPS coordinates from mobile devices 204, 208 and/or estimated locations of one or more of the mobile devices 204, 208 and/or fixed emitters 110, 114. Estimates of such locations can be determined using a variety of well know techniques, such as time difference of arrival of a signal, e.g., measured with respect to more than one base station 210, 212, triangulation, direction finding, e.g., using antenna pattern(s), and the like.

Figure 3:
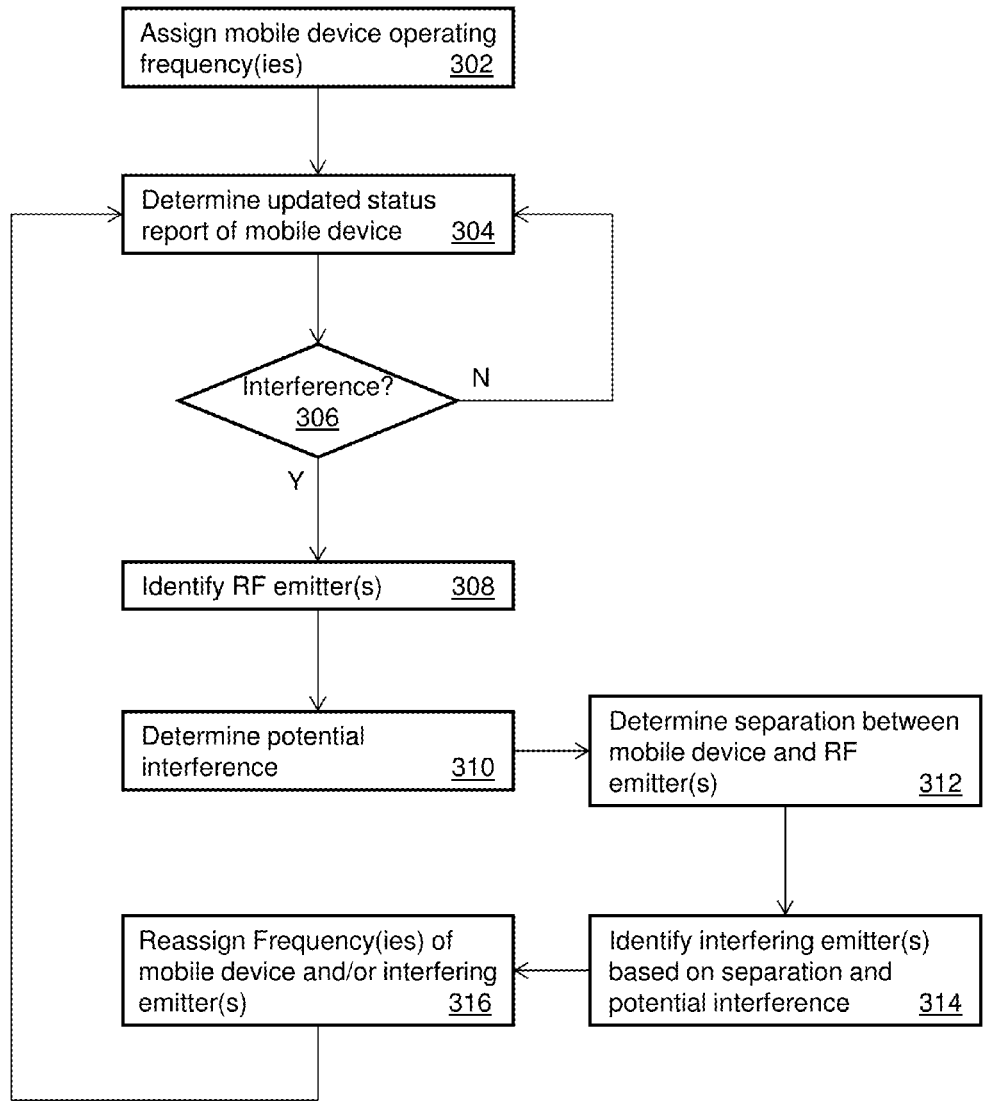
FIG. 3 depicts an illustrative embodiment of a process operating in portions of the system described in FIG. 2.

FIG. 3 depicts an illustrative embodiment of a process operating in portions of the system described in FIG. 2. A mobile device operating frequency or frequencies are assigned at 302 to a mobile device 102 (FIGS. 1A-1B). The operating frequency or frequencies can include an uplink frequency used for transmitting wireless signals from the mobile device 102 to the base station 104, 112. The operating frequency or frequencies can include one or more downlink frequencies used for receiving wireless signals from the base station 104, 112 at the mobile device 102. The frequency/frequencies assigned can include single frequency for up and downlink operations, e.g., TDD, and/or multiple frequency/frequencies with different frequencies used for up and downlink operations.

In at least some embodiments, the initial assignment of the operating frequency or frequencies can be accomplished according to a high-density spectral utilization protocol. An example of a high-density spectral utilization protocol includes an assignment of uplink and downlink frequencies for FDD operation(s) within the same frequency band, e.g., one of the defined bands of a wireless access protocol, such as the E-UTRA operating bands. Alternatively or in addition, the uplink and downlink times for TDD operations can be assigned for each mobile device prior to and/or during the course of operations, without regard for other wireless devices participating in TDD operations. It is foreseeable that such high-density spectral utilization can result in interference under certain circumstances, e.g., depending upon particular frequency assignments, an interference pattern based on such frequency assignment(s) as well as any other wireless emitters, and distances between the wireless and/or other emitters contributing to the interference pattern.

An updated status report of mobile device is determined at 304. The status report includes some measure of wireless performance, such as a measure of a receiver performance. For example, the status report can include one or more of a call-quality indicator (CQI), a bit-error rate (BER), a signal-to-noise ratio (SNR), a signal-to-noise-and-distortion ratio (SINAD), a signal-to-interference ratio (SIR) a carrier-to-interference ratio (CIR).

The status report, sometimes referred to as a current situation report, can also include other information about the mobile device, one or more settings of the mobile device, a configuration of the mobile device, etc. By way of illustrative example, the status report can include a modulation, e.g., QAM 16, QAM 64, a receive signal level, a transmit power level, and the like.

Interference can be determined at 306. To the extent there is no interference, updated status reports continue to be monitored at 304, with the presence of interference being periodically determined at 306. To the extent that interference is determined at 306, wireless emitters are identified at 308.

An estimate or determination of potential interference, sometimes referred to as an "interference pattern," is determined at 310. The interference can be determined according to one or more of frequency/frequencies and/or amplitude(s) of other radio frequency emitters. Preferably, the radio frequency emitters considered in determination of the interference pattern include substantially all radio frequency emitters within a radio range of the mobile device. In some instances, one or more radio frequency emitters can be excluded, e.g., if they are unlikely to contribute to interference pattern for various reasons. Some reasons include antenna directionality, e.g., located within a null, polarization, e.g., cross polarized, power level, modulation type, e.g., spread spectrum, etc.

The interference pattern can be determined with respect to the mobile device. Accordingly, the interference pattern can be based on separation(s) between one or more of the emitter(s) and a receive frequency of the mobile device. For example, a signal in an adjacent band can be included in an interference report, e.g., if the mobile device receiver is tuned to a frequency or channel that is close to a band edge of the adjacent band. Such consideration can also be a function of the amplitude of the signal. Thus, known strong emitters or broadcast sources, such as a DTV51 base station having a permit to transmit at 1 megawatt peak power within 692-698 MHz, an interfere with operation nearby channels.

In some embodiments, the emitters can include other wireless sources, such as macrocells, and/or smaller, low-power cellular base stations, e.g., femtocells. The spectral ranges of consideration for an emitter being generally proportional to a peak transmit power.

The frequency of operation of the emitters can be referred to as fundamental frequencies. In at least some embodiments, the interference pattern includes harmonics of the fundamental frequencies of the emitters. A highest order of harmonics can be predetermined for consideration, e.g., up to $3^{rd}$, $5^{th}$, or even $10^{th}$ harmonic or greater.

The highest order of harmonics can be fixed for all emitters, or tailored, at least to some degree, according to a signal strength of the emitter.

In at least some embodiments, the interference pattern can include intermodulation products, sometimes referred to as intermodulation distortion. Intermodulation products can be determined, e.g., according to Eqn. 3 for two emitters. Eqn. 3 can be expanded using more terms combined in a similar manner for intermodulation products resulting from more than two emitters, including higher-order intermodulation products involving three or more emitters. It should be understood that one of the emitters can include a transmitter of the mobile device. For example, if the mobile device is operating in FDD mode, the transmitter transmitting in an uplink portion of an assigned band can couple through a diplexer or similar circuit to the receiver. Although the coupled portion will be generally out of band and thereby filtered by a selective receiver filter, it will be possible that the coupled portion of the signal mixes with another signal to produce an IMD3 falling directly within the receiver pass band.

In at least some embodiments, the interference pattern includes a list of frequencies, e.g., emitter fundamentals, emitter harmonics, IMDs. The list might include additional information, e.g., relating to a source and/or actual, approximate or estimated power level. It should be understood that a simple identification of an interfering frequency or spectral component identified within such an interference report does not mean that any interference will be perceptible, e.g., by way of the updated status report. Other factors, such as physical separation or distance can be considered to determine which emitters likely to contribute to interference.

An estimate of a physical distance or separation between the mobile device and the RF emitter(s) is determined at 312. In at least some embodiments, a location of the mobile device can be determined from a current situation report. For example, the current situation report can include an indication of a location of the mobile device. For example, the device can self-report a location, e.g., determined by a GPS receiver of the mobile device. The location can include geolocation coordinates, e.g., a latitude, longitude, and in some instances, an elevation. The location can also be reported as a proximity to a reference location, such as geolocation coordinates, an address, a location of another device, such as a wireless access point, femtocell, a vehicle navigation system or by way of some other location system, such as a standalone GPS receiver. The location can be determined automatically, e.g., by one or more of the location determining features, a user-entered location or some combination of both.

Alternatively or in addition, the location of the mobile device can be determined or otherwise estimated by another device or system, such as one or more of the radio towers 104, 108, 112, 202, 206. Such location-determining techniques can include those used in mobile phone tracking. By way of example, localization of the mobile device can occur, e.g., according to multilateration of radio signals between several radio towers of a mobile cellular network and the mobile device. Multilateration is a navigation technique based on the measurement of a difference in distance to two or more radio towers at known locations that broadcast signals at known times. Other techniques can be used to estimate a location of the mobile device, e.g., when unavailable or otherwise indeterminable by the aforementioned techniques. Such estimating techniques can include one or more of estimating distance according to a receiver single level, a time difference of arrival of a signal level from the mobile device received at several cell towers, e.g., according to interferometry, and the like.

Once locations are determined, separation between one or more of the emitters and each other and/or the mobile device can be determined according geometric principles. For example, a vector can be determined with a tail on one of the emitters and a head on the mobile device. A magnitude of the vector represents a distance between the two.

Interfering emitter(s) can be identified based on the physical separation and identification as potential sources of interference at 314. By way of example, the interference pattern determined in 310 can be inspected to determine or otherwise identify interference components. The interference components of the interference patter can be, e.g., strong nearby signals, harmonics of other emitters, and/or IMD falling on or near a receive frequency of the mobile device. In one approach, a spectral difference between each interference component of the interference pattern and the tuned receive frequency can be determined Those interference components within a spectral tolerance can be identified as candidate interferers. In some embodiments, the spectral tolerance can be relatively small, e.g., within a receiver's tuned signal bandwidth. Alternatively or in addition, the spectral tolerance can be established according to a filter selectivity, e.g., in the receiver chain. This can include a band filter and/or a channel filter, and/or an intermediate frequency filter bandwidth.

For those interference components determined to be within the spectral tolerance, it is next determined whether their distance qualifies them as a likely interferer. Depending upon the frequency of operation and/or relative emitter amplitudes, at least some of the emitters contributing to the interference component can be included as likely candidate interferers or otherwise disregarded as candidate interferers based on the separation distance. Consider an emitter collocated with the mobile device, e.g., within the same room, or within some relative close distance, e.g., 50 ft, 100 ft, 500 ft, and so forth, as having a substantial likelihood of contributing to interference. If the nearby emitter is also an identified contributor to the interference component, then it can be identified as an emitter at 314. If however, either the distance and/or the interference pattern do not identify the emitter as a likely contributor the interference component, it can be disregarded.

Emitters, whether they are other mobile devices, or perhaps fixed sources, e.g., identified during a radio frequency site survey, generally have a corresponding amplitude. The amplitudes of the emitters can be determined as reported, or otherwise generally known or reliably estimated values, e.g., at the emitter source. Alternatively or in addition, the amplitudes of the emitters can be measured at the mobile device receiver, one or more of the cell towers, or some other wireless sensor.

Upon determining one or more emitters to satisfy both the interference pattern at 310 and the distance requirements at 312, it can be identified as an interferer at 314. One or more of the frequency/frequencies of the emitter(s) and the mobile device can be reassigned, such that the interference pattern no longer produces an interference component at or near the receive frequency of operation of the mobile device.

Such reassignment can be done in a "blind" sense, in that a number is selected without regard as to its likelihood as being a contributor to interference. Such reassignment can be determined according to a random selection of other channels within a band, or within another frequency band. Alternatively or in addition, the reassignment frequency can be selected according to one or more rules. By way of example, a rule can reassign a frequency to have a maximum spectral separation to the receiver operating frequency of the mobile device. Other rules can predict whether a reassignment frequency might produce interference before actually implementing such a reassignment. One such approach can be to determine a new or otherwise revised interference pattern according to the proposed reassignment frequency. If the proposed reassignment frequency produces one or more interference components at or within a spectral tolerance of the receive frequency, a new assignment can be made according to the same or different rule. The reassignment-testing process can be repeated, as needed, until a reassignment frequency is determined that will not result in an interference pattern to impact operation of the mobile device. Once determined the offending emitter(s) is/are reassigned to the new frequency/frequencies of operation at 316.

It is foreseeable that the wireless environment will be subject to change. The nature of the changes can depend on a number of variables, such as location, emitter density, spectral usage or density, relative motion between the mobile device and the one or more emitter(s), and so forth. Accordingly the process can be repeated, starting at 304 by determining an updated status report of the mobile device.

In the illustrative example, the identification of the RF emitters at 308, the determining potential interference at 310, and so forth, occur after having determined interference at 306. It is understood that in at least some embodiments, the RF emitters can be updated periodically, as required, to ensure that the RF emitters are substantially accurate during periods of operation. Likewise, determination of one or more of the potential interference at 310, the separation between mobile devices and emitters at 312 can be determined as required, e.g., periodically, as well. For example, the RF emitters are identified at 308, potential interference is determined at 310 and separation distances between the emitters and the mobile device are determined at 312 regardless of the existence of any interference at 306. If, however, interference is determined at 306, the current results of 308-312 can be used to determine interfering emitters at 314 and reassigning frequencies at 316.

In a first example, a dynamic access communication system supports data access running on two mobile devices running in adjacent bands independently without synchronization. One of the mobile devices can be running in downlink, while the other mobile device can be running in uplink at the same moment. Strong transmitting signal from the mobile device operating in the neighboring band can suppress normal operation of the RF receiver of the mobile device in the other band due in part to a relatively short distance between the two mobile devices. Device locations can be monitored and tracked. One such system for tracking device locations includes a coordinated multi-point transmission and reception system that monitors and tracks the device locations instantly. Potential interference patterns can be checked along with updated mobile device CQI report sent back through the network. The dynamic access communication system can switch channel assignments on one or both of these two mobile device accesses to break the potential interference pattern in the frequency domain.

In a second example, the mobile device has a transmitter and a receiver coupled to an antenna by way of a duplexer. The duplexer generally provides isolation between the transmitter and the receiver. When the mobile device is transmitting at a frequency $f_{2u}$ within an uplink frequency band 704-716 MHz and receiving at a frequency $f_{2d}$ in a downlink frequency band 734-746 MHz (i.e., E-UTRA operating band 17), the strong transmitting signal $f_{2u}$ from the mobile device's power amplifier can leak through the duplexer isolation into its receiving chain. This leaked signal component is usually considered to be harmless because it is an out-of-band signal and can be easily removed by a receiving filter. If above scenario happens when the mobile device is getting closed to a DTV51 base station which has the permit to transmit up to 1 megawatt peak power at a frequency (F1) within a broadcast frequency band 692-698 MHz, and the DTV signal reaches >−45 dBm at the device radio front end, the so called third-order intermodulation distortion impact can become an issue. The IMD3 is a non-linear signal combination of the DTV51 base station $f_1$ and the mobile device transmit signal $f_{2u}$. Namely, a combination of $2f_{2U}-f_1$ can fall in the range of 734-740 MHz, which represents a lower portion of the downlink frequency band. Due to the in-band nature of IMD3, there is no filter solution to resolve it.

Once the dynamic access communication system at the network detects the information from device location and RF impact report, it can switch the mobile device from current channel assignment of transmitting in 704-716 MHz and receiving in 734-746 MHz to another RF channel. The IMD3 pattern will be broken and the potential interference will be removed instantly.

Figure 4:
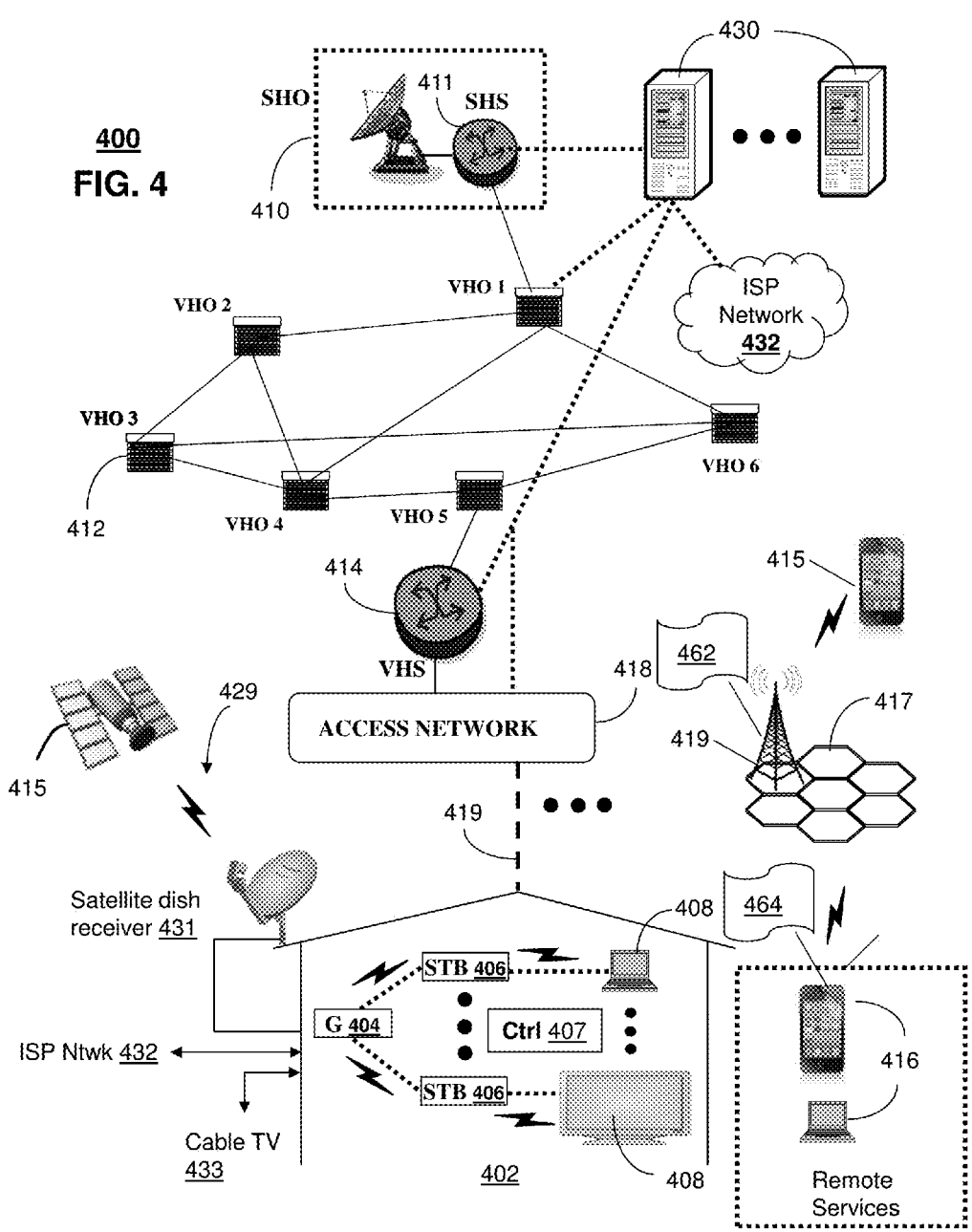
FIG. 4 depicts an illustrative embodiment of a communication system that provide media services to mobile devices subject to the interference scenarios of FIG. 1A and FIG. 1B, and with the mitigating features described in FIG. 2.

FIG. 4 depicts an illustrative embodiment of a first communication system 400 for delivering media content. The communication system 400 can represent an Internet Protocol Television (IPTV) media system. Communication system 400 can be overlaid or operably coupled with the mobile communication systems of FIGS. 1A-1B and/or FIG. 2 as another representative embodiment of communication system 400. A dynamic access communication system, e.g., implemented in a base station 419. The base station 419 can include a function 462 that determines an interference pattern between wireless emitter(s) 415 and a receiver of a wireless communication device 416, and determining distances between the wireless emitter(s) 415 and the wireless communication device 416. Interference at the receiver of the wireless communication device 416 is determined according to an updated status report. Upon detection of interference, an interfering source, e.g., the wireless emitter 415, is identified according to the interference pattern and the distance(s). In response to identifying the interfering source, one or more frequencies are reassigned to modify the interference pattern and thereby eliminate the source of interference. The wireless communication devices 416 can be provisioned with software functions 464 to utilize the services of the dynamic access communication system, e.g., providing information in an updated status report including a measure of receiver interference and/or position.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. (Bluetooth® and ZigBee® are trademarks registered by the Bluetooth® Special Interest Group and the ZigBee® Alliance, respectively). By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Cellular phones supporting LTE can support packet-switched voice and packet-switched data communications and thus may operate as IMS-compliant mobile devices. It is further noted that processes, devices and systems disclosed herein can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
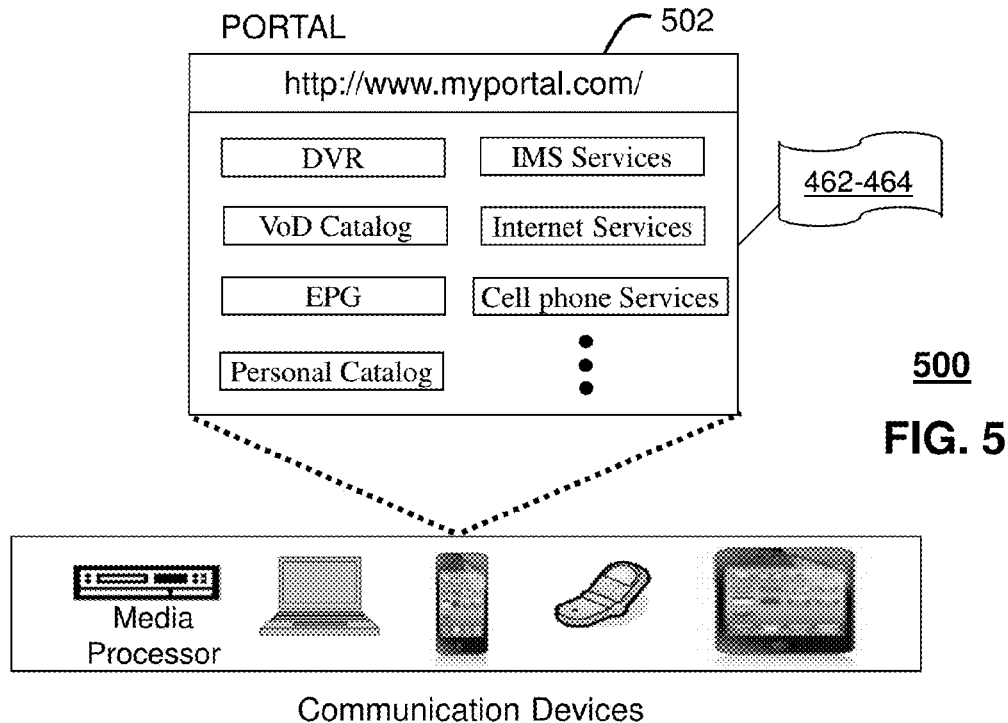
FIG. 5 depicts an illustrative embodiment of a web portal for interacting with the communication systems of FIG. 1A, FIG. 1B and FIG. 2.

FIG. 5 depicts an illustrative embodiment of a web portal 502 which can be hosted by server applications operating from the base station 419 of the communication system 400 illustrated in FIG. 4. The communication system 400 can be overlaid or operably coupled with system 200, as another representative embodiment of system of FIGS. 1A-1B and/or FIG. 2, and/or the communication system 400. A dynamic access communication system, e.g., implemented in a base station 419. The base station 419 can include a function 462 that determines an interference pattern between wireless emitter(s) 415 and a receiver of a wireless communication device 416, and determining distances between the wireless emitter(s) 415 and the wireless communication device 416. Interference at the receiver of the wireless communication device 416 is determined according to an updated status report. Upon detection of interference, an interfering source, e.g., the wireless emitter 415, is identified according to the interference pattern and the distance(s). In response to identifying the interfering source, one or more frequencies are reassigned to modify the interference pattern and thereby eliminate the source of interference. The web portal 502 can be used for managing services of the base station 200, 419, the wireless communication devices 416 and portions of the communication system 400. A web page of the web portal 502 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1A-1B and FIG. 2. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision the software applications 462-464 to adapt these applications as may be desired by subscribers and service providers of the communication system 400.

Figure 6:
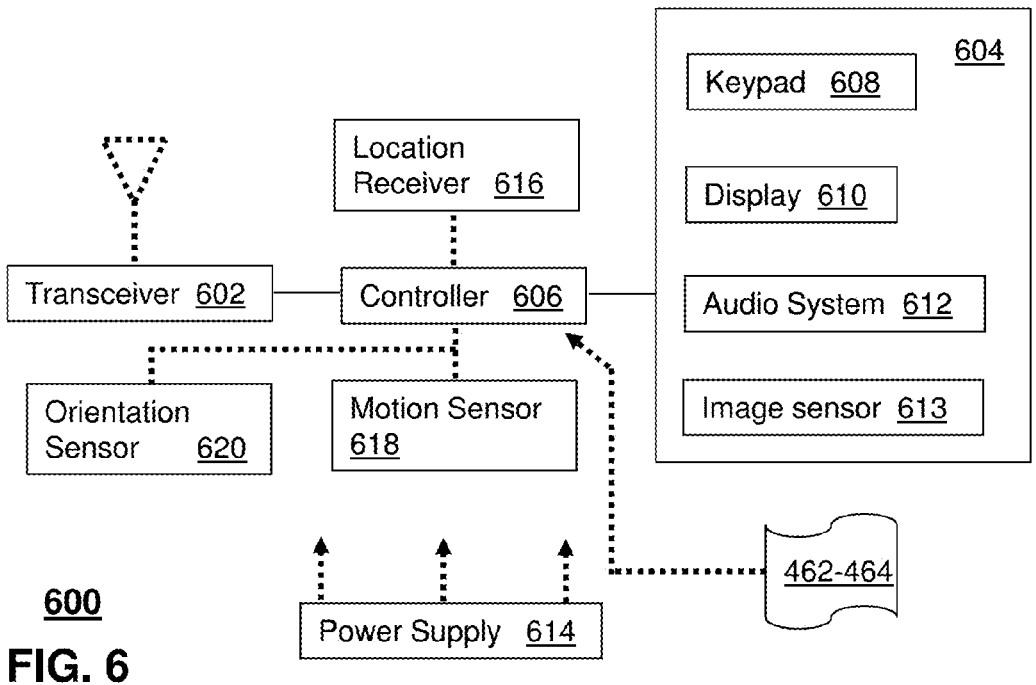
FIG. 6 depicts an illustrative embodiment of a communication device that can be used within the communication systems of FIG. 1A, FIG. 1B and FIG. 2.

FIG. 6 depicts an illustrative embodiment of a communication device 600. The communication device 600 can serve in whole or in part as an illustrative embodiment of the devices depicted in FIGS. 1A-1B, FIG. 2 and FIG. 4. A dynamic access communication system can be implemented in a base station. The base station can include a function 462 that determines an interference pattern between wireless emitter(s) and a receiver of a wireless communication device, and determining distances between the wireless emitter(s) and the wireless communication device. Interference at the receiver of the wireless communication device is determined according to an updated status report. Upon detection of interference, an interfering source, e.g., the wireless emitter is identified according to the interference pattern and the distance(s). In response to identifying the interfering source, one or more frequencies are reassigned to modify the interference pattern and thereby eliminate the source of interference.

To enable these features, communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to reestablish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the media processor 406, the media devices 408, or the portable communication devices 416 of FIG. 4. It will be appreciated that the communication device 600 can also represent other devices that can operate in the communication systems 200 and 400 of FIG. 2 and FIG. 4, such as a gaming console and a media player.

The communication device 600 shown in FIG. 6 or portions thereof can serve as a representation of one or more of the devices of system of FIG. 1A, FIG. 1B and/or FIG. 2, and communication system 400. In addition, the controller 606 can be adapted in various embodiments to perform the function 462.

Upon reviewing the aforementioned embodiments, it would be evident to an artisan with ordinary skill in the art that said embodiments can be modified, reduced, or enhanced without departing from the scope of the claims described below. For example, one or more features of the dynamic access communication system can be implemented on a network accessible device that is not necessarily incorporated into any one of the mobile base stations. For example, the dynamic access communication system can be implemented from a centralized source, such as a mobile network control center, and/or at another independent location, such as a third party offering dynamic access communication system features for mobile service providers. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
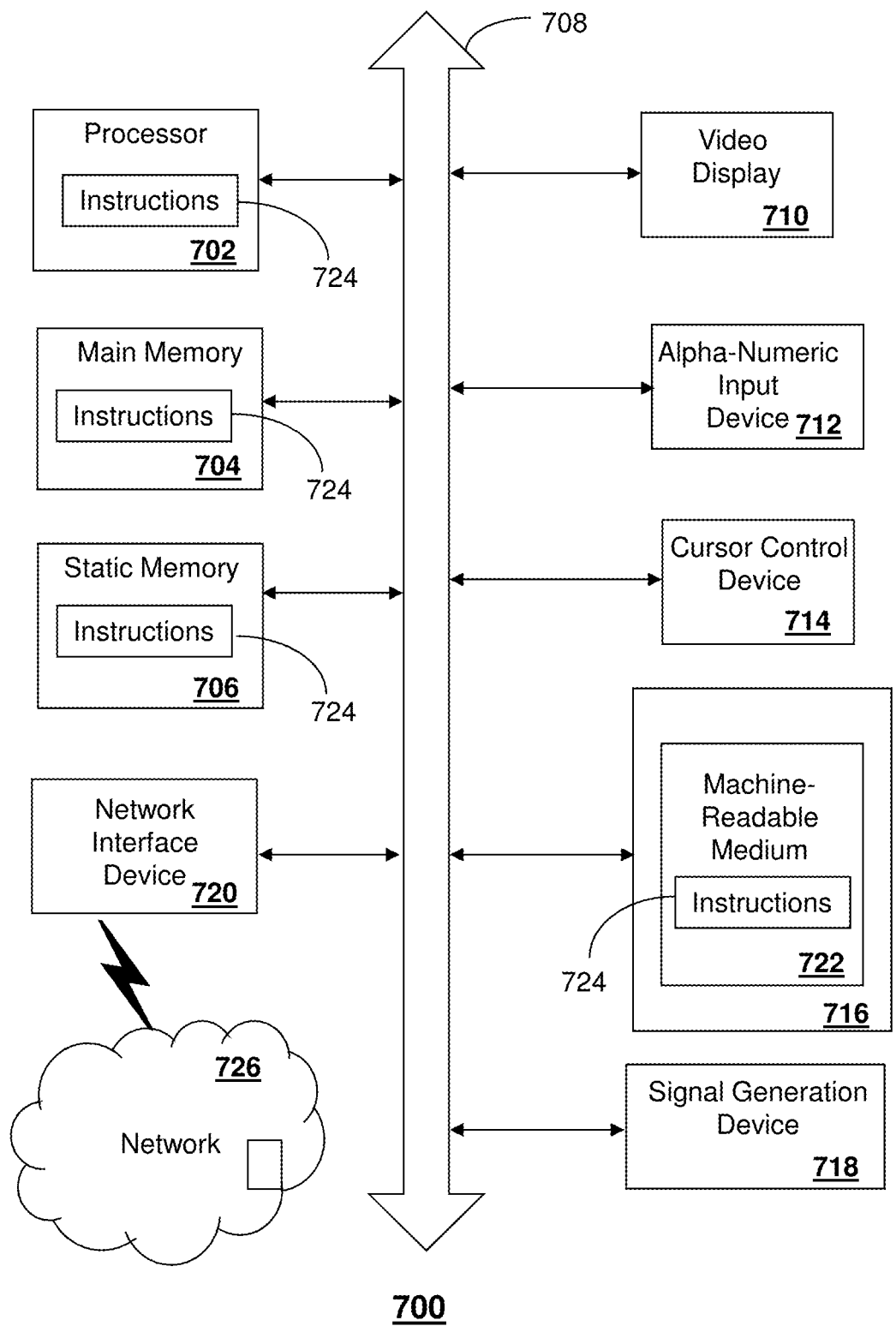
FIG. 7 is a diagrammatic representation of a machine in the form of a computer system within which a set of executable instructions, when executed, may cause the machine to perform any one or more of the processes disclosed herein.

FIG. 7 depicts an exemplary diagrammatic representation of a machine in the form of a computer system 700 within which a set of instructions, when executed, may cause the machine to perform any one or more of the methods describe above. One or more instances of the machine can operate, for example, as the base station 210, 419 the distance processor 228, the interference controller, the RF network scheduler 218, the network controller 224, the media processor 406 and other devices of FIGS. 1A-1B, FIG. 2 and FIGS. 4-6. In some embodiments, the machine may be connected (e.g., using a network 726) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described). Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more steps or functions, where the facilitating (e.g., facilitating access or facilitating establishing a connection) can include less than all of the steps needed to perform the function or can include all of the steps of the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations," this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
    a processor; and
    a memory that stores executable instructions that, when executed by the processor, facilitate performance of operations comprising:
        obtaining information regarding performance of a receiver of a wireless device, the wireless device operating at a receive frequency;
        determining interference at the wireless device based on the receiver performance at the receive frequency;
        identifying a plurality of wireless emitters at a plurality of emitter frequencies;

determining a wireless interference pattern based on the plurality of emitter frequencies;

determining a plurality of separation distances between the wireless device and at least some of the plurality of wireless emitters; and identifying an interference source based on the determining of the wireless interference pattern and the determining of the plurality of separation distances, the interference source being one of the plurality of wireless emitters, wherein the determining the wireless interference pattern comprises:

determining a plurality of potential interfering frequencies corresponding to non-linear combinations of emitter frequencies of the plurality of emitter frequencies; and disregarding a first portion of the plurality of potential interfering frequencies occurring outside of a receiver bandwidth of the wireless device comprising the receive frequency.

2. The device of claim 1, wherein the operations further comprise identifying a reassignment frequency for the interference source, based on the wireless interference pattern and separation distances of the plurality of separation distances.

3. The device of claim 2, wherein identifying the reassignment frequency further comprises testing a proposed reassignment frequency by determining a revised wireless interference pattern according to the proposed reassignment frequency.

4. The device of claim 1, wherein obtaining the information further comprises collecting an updated indication of the performance of the receiver.

5. The device of claim 4, further comprising assigning one of the emitter frequency of the plurality of emitter frequencies, the receive frequency, or a combination thereof, before collecting the updated indication of the performance of the receiver.

6. The device of claim 4, wherein the collecting is performed periodically.

7. The device of claim 1, wherein the determining the plurality of separation distances comprises:

determining emitter locations of the plurality of wireless emitters;

determining a location of the wireless device; and determining the plurality of separation distances as a plurality of distances between the location of the wireless device and emitter locations of the plurality of wireless emitters.

8. The device of claim 7, wherein a second portion of the plurality of potential interfering frequencies corresponds to a portion of the non-linear combinations occurring within the receiver bandwidth of the wireless device, and wherein identifying the interference source comprises identifying the emitter frequencies corresponding to each non-linear combination of the portion of the non-linear combinations.

9. The device of claim 1, wherein the wireless device is assigned to receive downlink communication signals at the receive frequency and assigned to simultaneously transmit uplink communication signals at a transmit frequency.

10. The device of claim 9, wherein the receive frequency and the transmit frequency are within a common frequency band.

11. The device of claim 1, wherein the wireless emitters of the plurality of wireless emitters are selected from the group consisting of the wireless device, different wireless devices, and stationary wireless emitters, and wherein the processor comprises a plurality of processors operating in a distributed processing environment.

12. A method comprising:

determining, by a device comprising a processor, interference at a wireless device based on performance of a receiver of the wireless device, the wireless device operating at a receive frequency;

identifying, by the device, a plurality of wireless emitters at a plurality of emitter frequencies;

determining, by the device, a wireless interference pattern based on the plurality of emitter frequencies;

determining, by the device, a plurality of separation distances between the wireless device and at least some of the plurality of wireless emitters; and identifying, by the device, an interference source based on the determining of the wireless interference pattern and the determining of the plurality of separation distances; and identifying, by the device, a reassignment frequency for the interference source, based on the wireless interference pattern and separation distances of the plurality of separation distances, wherein the determining the wireless interference pattern comprises:

determining a plurality of potential interfering frequencies corresponding to non-linear combinations of emitter frequencies of the plurality of emitter frequencies; and disregarding a portion of the plurality of potential interfering frequencies occurring outside of a receiver bandwidth of the wireless device comprising the receive frequency.

13. The method of claim 12, further comprising collecting an updated indication of the performance of the receiver.

14. The method of claim 12, wherein identifying the reassignment frequency further comprises testing a proposed reassignment frequency by determining a revised wireless interference pattern according to the proposed reassignment frequency.

15. The method of claim 12, wherein the determining the plurality of separation distances comprises:

determining emitter locations of the plurality of wireless emitters;

determining a location of the wireless device; and determining the plurality of separation distances as a plurality of distances between the location of the wireless device and emitter locations of the plurality of wireless emitters.

16. The method of claim 12, wherein the wireless emitters of the plurality of wireless emitters are selected from the group consisting of the wireless device, different wireless devices, and stationary wireless emitters, and wherein the processor comprises a plurality of processors operating in a distributed processing environment.

17. A non-transitory machine-readable storage medium comprising executable instructions that, when executed by a processor, facilitate performance of operations comprising:

obtaining information regarding performance of a receiver of a wireless device, the wireless device operating at a receive frequency;

determining interference at the wireless device based on the receiver performance at the receive frequency;

identifying a plurality of wireless emitters at a plurality of emitter frequencies;

determining a wireless interference pattern based on the plurality of emitter frequencies;

determining a plurality of separation distances between the wireless device and at least some of the plurality of wireless emitters;

identifying an interference source based on the determining of the wireless interference pattern and the determining of the plurality of separation distances, the interference source being one of the plurality of wireless emitters; and identifying a reassignment frequency for the interference source, based on the wireless interference pattern and separation distances of the plurality of separation distances, wherein the determining the wireless interference pattern comprises:

determining a plurality of potential interfering frequencies corresponding to non-linear combinations of emitter frequencies of the plurality of emitter frequencies; and disregarding a portion of the plurality of potential interfering frequencies occurring outside of a receiver bandwidth of the wireless device comprising the receive frequency.

18. The non-transitory machine-readable storage medium of claim 17, wherein identifying the reassignment frequency further comprises testing a proposed reassignment frequency by determining a revised wireless interference pattern according to the proposed reassignment frequency.

19. The non-transitory machine-readable storage medium of claim 17, wherein the determining the plurality of separation distances comprises:

determining emitter locations of the plurality of wireless emitters;

determining a location of the wireless device; and determining the plurality of separation distances as a plurality of distances between the location of the wireless device and emitter locations of the plurality of wireless emitters.

20. The non-transitory machine-readable storage medium of claim 17, wherein the wireless emitters of the plurality of wireless emitters are selected from the group consisting of the wireless device, different wireless devices, and stationary wireless emitters, and wherein the processor comprises a plurality of processors operating in a distributed processing environment.

* * * * *